Aug. 28, 1923.

A. L. POLLARD ET AL 1,466,340

WHEELED CULTIVATOR

Filed Nov. 30, 1921

Arthur L. Pollard Inventors
Ernest Baseman
by Geyer & Popp
Attorneys

Patented Aug. 28, 1923.                                                  1,466,340

UNITED STATES PATENT OFFICE.

ARTHUR L. POLLARD AND ERNEST BASEMAN, OF BATAVIA, NEW YORK, ASSIGNORS TO MASSEY-HARRIS HARVESTER COMPANY, INC., OF BATAVIA, NEW YORK, A CORPORATION OF NEW YORK.

WHEELED CULTIVATOR.

Application filed November 30, 1921. Serial No. 518,943.

*To all whom it may concern:*

Be it known that we, ARTHUR L. POLLARD and ERNEST BASEMAN, citizens of the United States, residing in Batavia, in the county of Genesee and State of New York, have invented new and useful Improvements in Wheeled Cultivators, of which the following is a specification.

This invention relates to a wheeled cultivator and more particularly to that type of wheeled cultivators in which the wheels and cutivating tools are capable of being turned laterally at will in either direction for the purpose of causing the tools to adapt themselves to rows of plants which are arranged in a straight line, but which deviate more or less from such a line.

Its purpose is to provide a cultivator of this character whereby the wheels and cultivator tools may be easily adjusted at will with a minimum expenditure of manual labor while the machine is traveling forwardly and to accomplish this by means which are comparatively simple in construction, not liable to get out of order and capable of being produced at low cost.

Similar characters of reference refer to like parts throughout the several views.

Although the main frame of this wheeled cultivator may be variously constructed, that shown in the drawings is preferred and as there shown the same comprises a main cross piece or bar 10, a longitudinal pole 11 projecting forwardly from the central part of this cross piece and adapted to be connected with a tractor or draft animal for pulling the machine forwardly over the ground, two inner longitudinal sills 12 around opposite sides of the longitudinal center of the machine, having their front ends spaced apart a considerable distance and secured to the upper side of the cross piece 10 while their rear ends are arranged closer together and connected with each other, two outer longitudinal sills 33 which have their front end portions 34 converged forwardly and secured to the cross piece 10 and the pole 11, longitudinal seat bars 13 connected at their front ends with the rear ends of the inner longitudinal sills 12 and a seat 14 for the driver or operator mounted on the rear parts of the seat bars 13.

15, 15 represent the supporting wheels of the cultivator which are arranged on the opposite longitudinal sides of the same in rear of the cross piece 10, and 16, 16 two gangs of cultivator tools, such as plows or shovels which are shown in the drawings and which are arranged side by side from opposite sides of the longitudinal center line of the machine and adjacent to the inner sides of the supporting wheels. Means are provided for mounting the supporting wheels on the main frame of the cultivator, so as to permit of balancing the machine when raising and lowering the cultivator tools and also to permit of either arranging these supporting wheels parallel with the line of draft when it is desired to move straight forward or to change the angle of these wheels so as to cause the cultivator to travel obliquely forward either toward one side or the other of the machine, when it is desired to change the course of the tools and adapt the same to a crook in the row of plants which is being cultivated. The preferred means for thus adjusting the wheels, which are shown in the drawings, are constructed as follows:

Arranged between the cross piece 10 and the seat 14 is a horizontal body 17 of a crank axle which body is journaled in suitable bearings 18 on the adjacent parts of the outer frame sills 33 and provided at its opposite ends between these frame sills and the supporting wheels with downwardly projecting arms 19. Each of the wheels is pivotally mounted on the axle so as to be capable of rotation about a horizontal transverse axis for moving forwardly as well as turning about a vertical axis for the purpose of causing the wheel to be moved forwardly at an angle relative to the longitudinal draft line.

In its preferred form, each of these mountings comprises an upright steering shaft 20 which is journaled in suitable bearings 21 on the adjacent axle arms 19, a horizontal spindle 22 which projects laterally from the lower end of the steering shaft 20, upon which one of the supporting wheels is journaled, and a horizontal steering arm 23 projecting horizontally forward from the upper end of the steering shaft 20. These two wheel mountings are operatively connected so that they work in unison and always cause the supporting wheels to be maintained in parallelism, this being preferably accomplished by means of a horizontal steering bar 24 arranged transversely below the frame sills 12 and connected at its opposite ends with the front ends of the steering arm 23, as shown in Figs. 1, 2, 3, 4 and 9.

Figure 1:
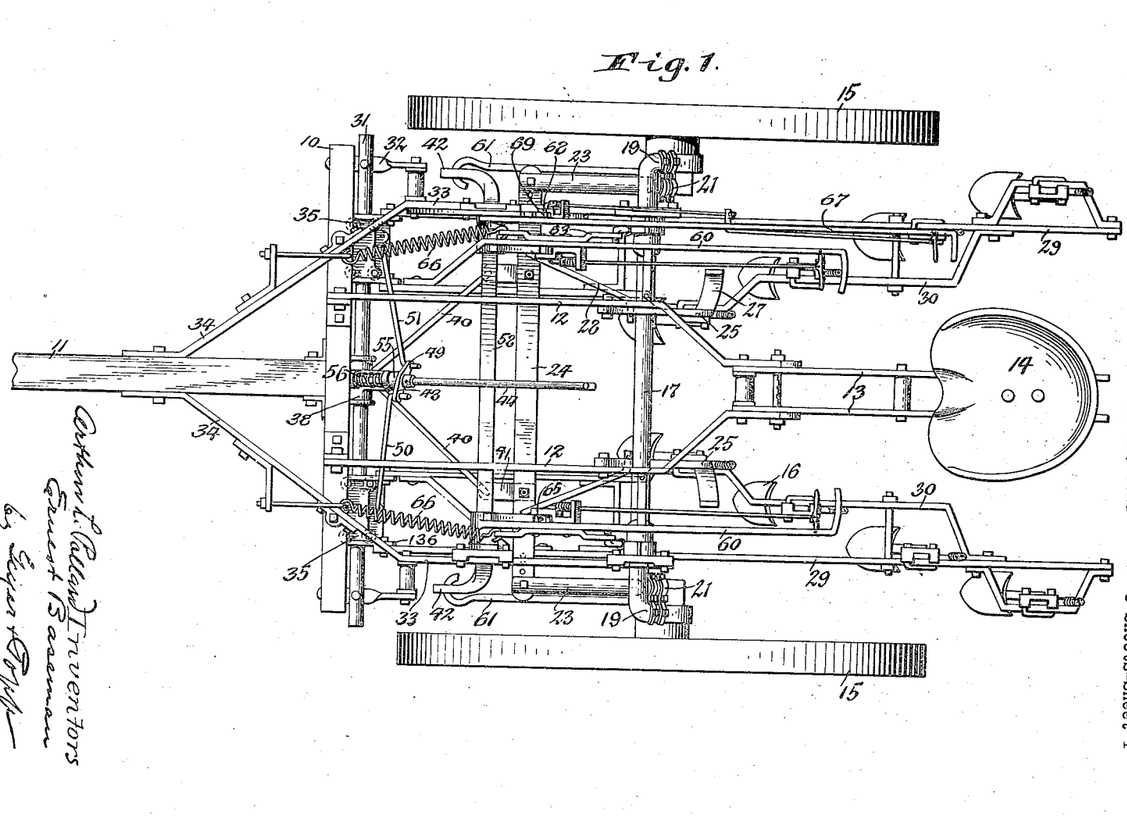
Figure 1 is a top plan view of a wheeled cultivator embodying our improvements and showing the parts in the position which they occupy when the supporting wheels and cultivator tools are moving forwardly in a line parallel with the line of draft.
Figure 2:
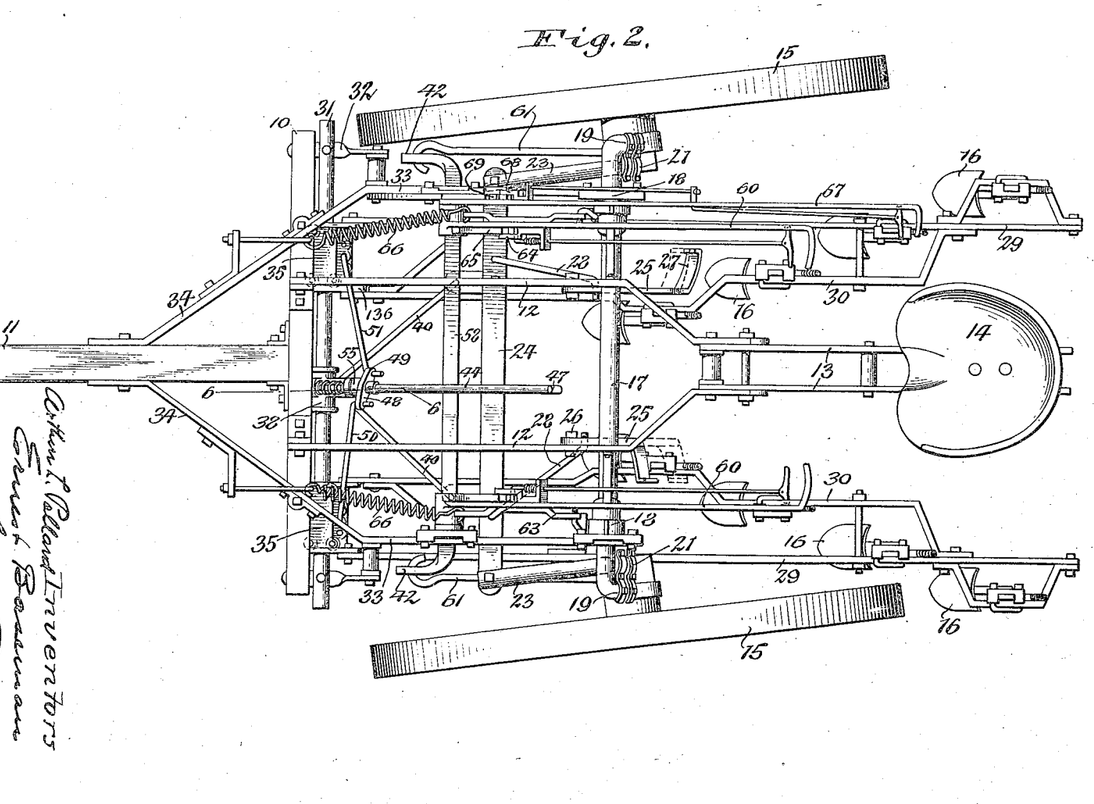
Figure 2 is a similar view showing the supporting wheels and the cultivator tools arranged in the position which they occupy when the mechanism is adjusted for causing the same to travel forwardly at an angle to the line of draft while adapting the position of the tools to a lateral deflection in the row of plants which are being cultivated.

When the supporting wheels are parallel with the line of draft, as shown in Fig. 1, the cultivator as a whole travels straight forwardly together with the cultivator tools which is the normal position of the parts when the rows of plants which are being cultivated are straight or comparatively so. When, however, the rows of plants are deflected to one side or the other, the supporting wheels are turned about their axes at an angle toward one side or the other of the machine so as to carry the cultivating tools in the corresponding direction to suit a deviation in the line of the row of plants, Fig. 2 showing the parts in such an angular position for the purpose of cultivating a row of the plants which deflect toward the left of the straight line. The position of the wheels is preferably manually controlled for this purpose by means of two foot levers 25, 25, which are arranged on opposite sides of the center of the machine in front of the seat and pivoted at their upper ends to the frame sills 12 by means of bolts 26 or otherwise, so that these levers are capable of swinging forwardly and backwardly, the pedal or treadle 27 being arranged at the lower ends of these levers and adapted to receive the feet of the operator while he is seated on the seat 14, and two shifting rods or links 28 which diverge forwardly and which are connected at their rear ends with the foot levers 25, while their front ends are connected with a steering bar 24. Upon pressing on the left hand foot lever 25 by means of the left foot, the steering mechanism will be operated, placing the supporting wheels into the position shown in Fig. 2, which causes the cultivator to travel obliquely forward toward the left, while upon pressing the right hand foot lever 25 forwardly, the steering mechanism will be operated for causing the cultivator to travel obliquely forward toward the right with reference to the line of draft.

Each gang of cultivator tools is mounted upon the rear end of a draft beam which may be variously constructed, but which in its preferred form comprises two longitudinal drag bars or draw bars 29, 30 upon the rear ends of which the tools are mounted in any suitable manner, and the front ends of which are mounted on the main frame of the machine in such a manner that two gangs of tools may be moved vertically either simultaneously or independently of each other and also move laterally to correspond with the angular movement of the supporting wheels, and also adjusted transversely relatively to each other for the purpose of varying the space between the two gangs of tools in order to adapt the same to the distance between adjacent rows of plants or other conditions. The preferred means for thus mounting the draft beams on the main frame are constructed as follows:

The numeral 31 designates a horizontal guide bar which is arranged transversely adjacent to the rear side of the cross piece 10 and fixed on the main frame so as to be stationary or immovable relatively thereto, but secured at opposite ends of this guide bar to brackets 32 on the adjacent parts of the cross piece and the outer longitudinal frame sills 33.

The numerals 35, 35 designate two draw heads or draft heads which are arranged on the guide bars 31 on opposite sides of the longitudinal center of the machine, each of which is provided at its opposite ends with rearwardly projecting lugs 136 to which the front ends of the bars 29 and 30 on one of the draft beams are secured. The guide bar 31 is preferably round and the bores of the draft heads are also of cylindrical form and these draw heads are capable of moving lengthwise upon this guide bar crosswise of the machine and also turning vertically thereon. In order to relieve the frictional engagement of these draw heads with the guide bar without interfering with their horizontal longitudinal movement on this guide bar or the vertically swinging movement thereon, each of these draw heads is provided adjacent to its opposite ends with a pair of anti-friction rollers 36, the members of each pair of these rollers being pivoted on one end of the respective draw head so that they are transversely in line, and each of the anti-friction rollers being provided between its opposite ends with a circumferential groove 37 which engages with a considerable part of the periphery of the guide bar 31 and thereby forms an effective guide therefor which will relieve the friction and avoid undue wear upon the parts so that the same will always work easily when the parts require shifting.

On the central part of the guide bar 31 between the draw heads 35 is mounted an adjusting block or head 38 which is also capable of sliding lengthwise on the bar crosswise of the machine and also turning in a vertical plane about the same. On its underside this adjusting block 38 is provided with a coupling eye or loop 39 which opens fore and aft and forms part of the means whereby the steering bar 24 is connected with the adjusting block 38 and the parts associated therewith. The additional parts of this coupling device consists of a yoke which in the preferred form is made up of two rearwardly diverging yoke bars 40 which are connected at their rear ends with ears 41 projecting forwardly from the steering bar 24 while the front ends of these yoke bars terminate in a coupling tongue 43 which projects forwardly through the coupling eye or loop 39, this tongue and the yoke bars 40 being preferably constructed from a single piece of round iron, as best shown in Figs. 5, 6, 7 and 9.

Upon shifting the steering bars 24 horizontally and crosswise of the machine toward one side thereof or the other, the coupling yoke 40 causes the adjusting block 38 to move lengthwise on the guide bar 31 in the same measure by engagement of the tongue 43 of this yoke with the coupling eye 39 of the adjusting block. This movement of the adjusting block is transmitted to the draw heads 35 by means of intermediate connecting mechanism so that the two draw beams and the tools mounted thereon are moved laterally in one direction or the other relatively to the line of draft, which intermediate mechanism is preferably so constructed that the same also serves as adjusting means for varying the spaced relation between the two sets or gangs of tools on the draft beams.

In its preferred form this adjustable shifting mechanism between the adjusting block 38 and the two draw heads 35 arranged on opposite sides of the same are constructed as follows:

The numeral 44 represents a longitudinal adjusting shaft which is journaled at its front end in bearings 45 and 46 arranged on the upper part of the adjusting block 38 and provided at its rear end with a handle 47 whereby the same may be moved lengthwise and also turned in its bearings by the operator, for which purpose the handle 47 is arranged within convenient reach, while the operator is occupying the seat 14. In rear of the rear bearing 46 the adjusting shaft is provided with two adjusting arms 48, 49 which project radially from opposite sides thereof, the upper arm projecting upwardly and being connected by a shifting link or rod 50 with the left hand draw head 35 while the lower arm 49 projects downwardly and is connected with the right hand draw head 35. Upon turning the adjusting shaft 44 the two draw heads can be moved toward or from each other and thus vary the space between the same in accordance with the distance between the rows of plants which are to be cultivated.

Figures 4, 5, 6:
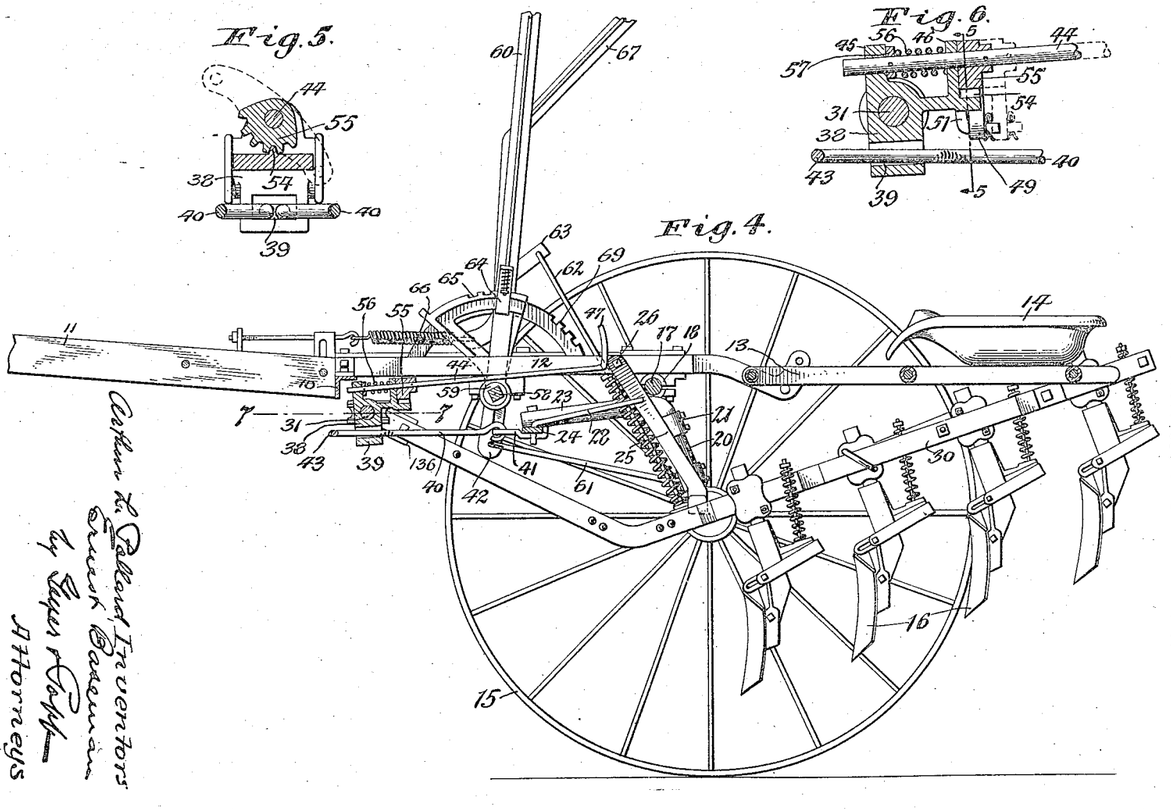
Figure 4 is a similar view showing the cultivator tools elevated into their inoperative position.
Figure 5 is a cross section taken on line 5—5, Fig. 6.
Figure 6 is a fragmentary longitudinal section, on an enlarged scale, taken on line 6—6, Fig. 2.
Figures 7, 8, 9:
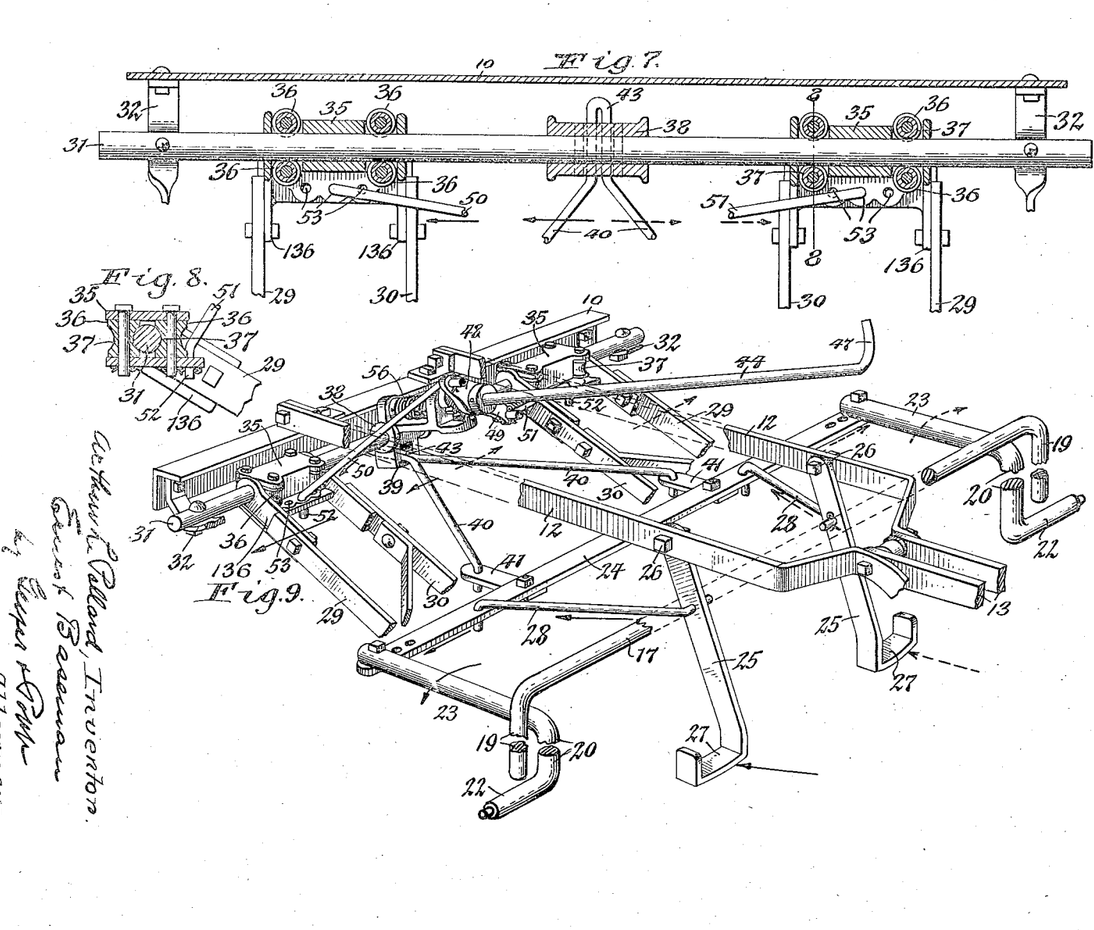
Figure 7 is a fragmentary horizontal section, on an enlarged scale, taken on line 7—7, Fig. 4.
Figure 8 is a vertical section taken on line 8—8, Fig. 7.
Figure 9 is a fragmentary perspective view of the part of the mechanism for controlling the angularity of the forward movement of the supporting wheels and tools relative to the draft line of the machine.

In order to effect a preliminary adjustment of the shifting rods 50, 51 relative to the drawing heads, the outer end of each of these shifting rods is provided with a pin 52 which may be engaged with one or another of the transverse row of openings 53 formed on the flange and projecting rearwardly from the lower part of the respective draw head 35, as best shown in Figs. 7, 8 and 9. By shifting these pins 52 of these rods from one opening 53 in these draw heads to another, the initial adjustment of the two draw beams may be effected in accordance with the character of the tools which are employed, the character of the crops which are being cultivated, or any other condition. After such adjustment the two draw heads and the cultivating tools associated therewith are held in a definite relation to each other by means of a locking mechanism which preferably comprises a locking lug 54 projecting outwardly from the rearwardly projecting flange on the adjusting block 38 and a locking gear segment 55 arranged on the adjusting shaft 44 and adapted to engage one or another of its teeth with the locking tooth 54. For the purpose of adjusting the two gangs of cultivator tools transversely relatively to each other the adjusting shaft 44 is first pulled rearwardly so as to disengage its gear segment 55 from the locking lug 54, then this adjusting shaft is turned until the two gangs of tools are moved into the desired position relative to each other, then the adjusting shaft is again moved forwardly so as to engage the space between two of its teeth with the locking lug 54, whereby the tool gangs are locked in spaced relation cross-wise of the machine. The gear segment 55 and the adjusting arms 48 and 49 are preferably formed integrally with each other, as shown in Fig. 6 and secured to the adjusting shaft 44 by means of a pin or any other suitable means. The gear segment is preferably held yieldingly in engagement with the locking tooth 54, this being accomplished in the present instance, by means of a spring 56 surrounding the adjusting shaft 44 and bearing at its rear end against the rear bearing 46 while its front end bears against a collar 57 secured to this adjusting shaft. Upon turning the adjusting shaft rearwardly the spring 56 is compressed and upon releasing the rearward pull of the adjusting shaft the spring 56 moves the same forwardly and causes the locking segment 55 to automatically engage the locking lug 54. The forward movement of the adjusting shaft 44 may be limited in various ways for instance, as shown in Fig. 6 by engagement of the gear segment 55 with the rear side of the bearing 46 and the engagement of the collar 57 with the rear side of the bearing 45.

When the adjusting shaft 44 is thus interlocked with the adjusting block 38, the latter and the draw heads are compelled to move crosswise of the machine in unison, during which movement the adjusting block and the draw heads slide lengthwise upon the guide rod 31, a transverse movement of the adjusting head and draw bars is imparted to the same by the yoke 40, 43, which couples the adjusting head 38 with the steering bar 24 so that whenever the operator moves the steering bar crosswise of the machine, for angling the supporting wheels in one direction or the other, a corresponding movement will be imparted to the two sets or gangs of tools so that as the supporting wheels travel obliquely forward toward one side or the other of the line of draft for carrying the gangs of tools in a corresponding direction to adapt themselves to any crookedness in the row of plants, a straight forward pull will always be imparted to these tool gangs regardless of the position of the same transversely of the machine.

Figure 3:
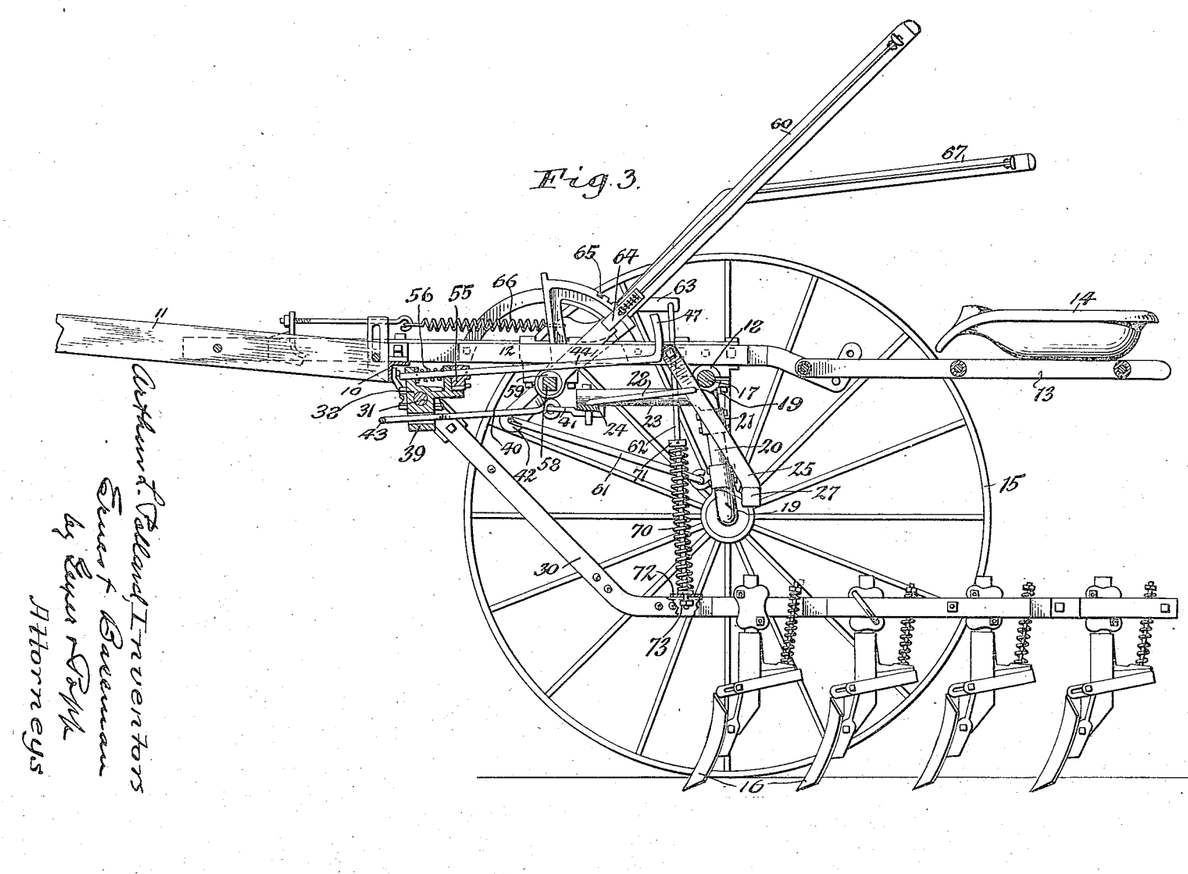
Figure 3 is a longitudinal section or elevation of the machine taken through the central part of the same and showing the cultivator tools lowered into their operative position.

Means are provided for raising and lowering each gang of tools independently of the other for bearing the pressure of the same against the ground, as well as permitting these gangs to be operated simultaneously for raising them bodily from the ground while transporting the machine. This mechanism in its preferred form is constructed as follows:

The numeral 58 is a pressure shaft arranged transversely or horizontally of the adjusting shaft 31 and journaled in suitable bearings on the adjacent parts of the main frame. The central part of this shaft is made square and receives two bearing sleeves 59 having square shoulders which fit the corresponding shape of this shaft, so that these parts are compelled to turn together. Upon each of these sleeves 59 is mounted an individual pressure lever 60 which is capable of swinging forwardly and backwardly, this lever being held in different positions relative to this shaft 58 by means of a locking pawl 64 mounted on this lever and adapted to be engaged with a toothed locking segment 65 formed on or connected with the adjusting sleeve 59. Upon swinging the pressure lever downwardly this movement is transmitted to one of the draft beams by means of a pressure rod 62 which is connected at its upper end with a bracket 63 on the respective pressure lever, and a pressure spring 70 surrounding this pressure rod and bearing at its upper end against a collar 71 on the pressure rod while its lower end bears against a cross piece 72 on the respective draft beam. The upward movement of the pressure rod 62 relative to the respective draft beam is limited by means of a screw nut 73 on the lower end of the pressure rod 62 and adapted to bear against the underside of the plate 72 on the respective draft beam, as best shown in Fig. 3.

When it is desired to raise the draft beams and cultivator tools thereon into an inoperative position above the ground for convenience in transporting the cultivator, the pressure shaft 58 is turned so that its upper side moves forwardly by means of a lifting lever 67 which is connected with the pressure shaft 58 near one end thereof, for instance, adjacent to the right hand end, as shown in Figs. 1 and 2, this lever being retained in its forward position and the draft beams in their elevated position by means of a catch 68 arranged on this main or master lever 67 and engaged with a locking gear segment 69 on the adjacent part of the main frame. During this forward movement of the master lever 67 the pressure levers 60 are caused to turn with the pressure shaft 58 and the master lever by reason of the pressure levers having their locking pawls or catches 64 in engagement with the toothed locking segment 65 so that these parts at this time turn as a unit whereby the pressure rods 62 are caused to lift the tool carrying draft beams by engagement of the nuts 73 at the lower ends of the pressure rods 62 with the underside of the pressure plate 72.

In order to balance the weight of the draft beams and assist the operator in lifting the same, springs are provided, each of which is connected at its rear end with the bracket 63 on one of the pressure levers while its front end is connected with an adjacent part of the main frame as shown in Figs. 1—4.

For the purpose of balancing the weight of the several parts of the machine more effectively on the supporting wheels while transporting the machine in an inactive condition, means are provided for drawing the supporting wheels rearwardly from the position which they occupy during the cultivating operations and thereby cause these wheels to be located more nearly in line with the center of the road in a direction fore and aft of the machine, while merely transporting the same. A convenient means for accomplishing this purpose consists in providing the opposite ends of the pressure shaft 58 with two downwardly projecting shifting arms 42, each of which is connected by means of a link or rod 61 with the downwardly projecting axle arm 19 on the adjacent end of the axle body 17, as best shown in Figs. 1—4, whereby upon moving the master or main lever 67 forwardly for turning the pressure shaft, the arms of the axle and the supporting wheels mounted thereon would be shifted from a nearly upright and forward position, as shown in Fig. 3, to a greater rearwardly inclined and rearward position, as shown in Fig. 4, so that in this last-mentioned position the weight of the several parts of the cultivator is more uniformly distributed in front and rear of the axes of the supporting wheels. During such forward and rearward adjustment of the supporting wheels, the operative connection between the steering bar 24 and the adjusting block 38 is not disturbed, inasmuch as the tongue 43 on the coupling yoke, at this time, merely slides lengthwise in the coupling eye 39 and is free to rock vertically therein for adapting it to a changed position of these parts without producing any binding action.

The improvements of this wheeled cultivator not only permit of easily and conveniently operating the same, but the same are also very durable, not likely to get out of order, and capable of being produced at comparatively low cost.

I claim as my invention:

1. A wheeled cultivator comprising a main frame, a horizontal guide bar fixed transversely on said main frame, an adjusting block which is slidable lengthwise on the central part of said guide bar, draw heads slidable on said guide bar on opposite sides of the adjusting block, draw bars pivotally connected with said draw heads so as to be capable of swinging vertically relatively thereto but compelled to move laterally therewith, and means for adjustably connecting said draw heads with said adjusting block.

2. A wheeled cultivator comprising a main frame, a horizontal guide bar fixed transversely on said main frame, an adjusting block which is slidable lengthwise on the central part of said guide bar, draw heads slidable on said guide bar on opposite sides of the adjusting block, draw bars pivotally connected with said draw heads so as to be capable of swinging vertically relatively thereto but compelled to move laterally therewith, means for adjustably connecting said draw heads with said adjusting block, and means for simultaneously moving said draw heads and adjusting block on said guide rod.

3. A wheeled cultivator comprising a main frame, a horizontal guide bar fixed transversely on said frame, an adjusting block slidable lengthwise on the central part of said bar, draw heads slidable lengthwise on said bar on opposite sides of said block, draw bars connected with said heads and adapted to carry cultivator tools, and means for adjusting said draw heads relatively to each other and said block comprising an adjusting shaft journaled on said block and having arms projecting in opposite directions, links connecting said arms with said heads, respectively, and means for locking said adjusting shaft in its adjusting position comprising a lug arranged on said block, and a locking gear segment arranged on said shaft and adapted to engage one or another of the spaces between its teeth with said lug.

4. A wheeled cultivator comprising a main frame, an axle mounted on said frame, supporting wheels, means for mounting said wheels on said axle so that the same can turn about a vertical axes, a steering bar connecting said wheel mounting means, a guide rod fixed on the main frame, an adjusting block slidable on the guide rod and connected with said steering bar, draw heads slidable on said guide bar on opposite sides of said adjusting block, draw bars connected with said draw heads and provided with cultivator tools, and adjusting means connecting said draw heads with said adjusting block.

5. A wheeled cultivator comprising a main frame, an axle mounted on said frame, supporting wheels, means for mounting said wheels on said axle so that the same can turn about vertical axes, a steering bar connecting said wheel mounting means, a guide rod fixed on the main frame, an adjusting block slidable on said guide bar, coupling means connected with said steering bar and engaging with said adjusting block so as to compel said steering bar to move therewith in a direction lengthwise of the guide bar but permitting said steering bar to move independently of said block in a direction at right angles to said guide bar, draw heads slidable on said guide bar on opposite sides of said adjusting block, adjusting means connecting said draw heads with said adjusting block, and draw bars connected with said draw heads and provided with cultivator tools.

6. A wheeled cultivator comprising a main frame, an axle mounted on said frame, supporting wheels, means for mounting said wheels on said axle so that the same can turn about vertical axes, a steering bar connecting said wheel mounting means, a guide rod fixed on the main frame, an adjusting block slidable on said guide bar and provided with a coupling eye, a coupling yoke connected at its rear end with said steering bar and provided at its front end with a coupling tongue which is arranged in said eye, draw heads slidable lengthwise on said guide bar on opposite sides of said block, draw bars connected with said draw heads and provided with cultivator tools, and adjusting means connecting said draw heads with said block.

7. A wheeled cultivator comprising a main frame, a crank axle having a horizontal body journaled on the rear part of the frame and provided with depending arms, wheel mountings each having an upright crank shaft journaled on one of said axle arms, a spindle projecting laterally from the lower end of the crank shaft and a steering arm projecting forwardly from said crank shaft, wheels journaled on said spindles, a steering bar connecting said steering arms, a guide bar fixed on the front part of the main frame, an adjusting block slidable on the central part of said guide bar, coupling means connecting said adjusting block and said steering bar and constructed to compel said steering bar to move crosswise of the machine with said adjusting block but permitting said steering bar and associated parts to move in a direction lengthwise of the machine independently of said adjusting block, draw heads slidable on said guide bar on opposite sides of said adjusting block, adjusting means connecting said adjusting block with said draw heads, draw bars connected at their front ends with said draw heads and provided on their rear parts with cultivator tools, and means for shifting said steering bar crosswise of the machine.

ARTHUR L. POLLARD.
ERNEST BASEMAN.